(12) United States Patent
El Mghazli et al.

(10) Patent No.: US 8,112,530 B2
(45) Date of Patent: Feb. 7, 2012

(54) ACTIVE MEDIUM FOR RESERVING RESOURCES IN A COMMUNICATION NETWORK

(75) Inventors: Yacine El Mghazli, Arcueil (FR); Olivier Marce, Massy (FR); Laurent Clevy, Chartres (FR)

(73) Assignee: Alcatel Lucent, Paris (FR)

( * ) Notice: Subject to any disclaimer, the term of this patent is extended or adjusted under 35 U.S.C. 154(b) by 1001 days.

(21) Appl. No.: 10/675,972

(22) Filed: Oct. 2, 2003

(65) Prior Publication Data

US 2004/0107292 A1    Jun. 3, 2004

(30) Foreign Application Priority Data

Oct. 3, 2002    (FR) ..................................... 02 12244

(51) Int. Cl.
*G06F 15/16*    (2006.01)
(52) U.S. Cl. ........ 709/227; 370/322; 370/348; 370/439; 370/443
(58) Field of Classification Search .................. 709/226, 709/227, 204, 208; 370/401, 351, 400, 322, 370/439, 443; 375/240.27
See application file for complete search history.

(56) References Cited

U.S. PATENT DOCUMENTS

| | | | |
|---|---|---|---|
| 6,393,474 B1 * | 5/2002 | Eichert et al. ................. | 709/223 |
| 6,498,795 B1 * | 12/2002 | Zhang et al. ................... | 370/400 |
| 6,570,926 B1 * | 5/2003 | Agrawal et al. ............... | 370/474 |
| 6,693,912 B1 * | 2/2004 | Wang ............................ | 370/401 |
| 6,697,863 B1 * | 2/2004 | Egawa et al. .................. | 709/226 |
| 6,930,984 B1 * | 8/2005 | Nomura et al. ............... | 370/254 |
| 6,981,044 B1 * | 12/2005 | Coez et al. .................... | 709/226 |
| 7,313,593 B1 * | 12/2007 | Pulito et al. ................... | 709/204 |
| 2003/0084151 A1 * | 5/2003 | Simpson et al. .............. | 709/225 |
| 2005/0018607 A1 * | 1/2005 | Frouin .......................... | 370/230 |
| 2005/0068952 A1 * | 3/2005 | Deiss et al. ................... | 370/389 |
| 2005/0220072 A1 * | 10/2005 | Boustead et al. ............. | 370/351 |

OTHER PUBLICATIONS

Alexander, D. Scott, et al. "Active Network Encapsulation Protocol (ANEP)". Jul. 1997.*
R. Braden et al, "RFC 2205: Resource Reservation Protocol (RSVP)—Version 1 Functional Specification", IETF RFC 2205, Sep. 1997, XP002204209.
S. Herzog: "RSVP Extensions for Policy Control", IETF RFC 2750, 'en ligne! Jan. 2000, pp. 1-13, XP002244990.
S. Herzog, "COPS Usage forRSVP", IETF RFC 2749, 'en ligne! Jan. 2000, pp. 1-17, XP002244991.
Ralph Wittmann et al, "AMnet: Active Multicasting Network", Communications, 1998. ICC 98. Conference Record. 1998 IEEE International Conference in Atlanta, GA, USA Jun. 7-11, 1998, NY, NY Jun. 7, 2998, pp. 896-900, XP010284776.

* cited by examiner

*Primary Examiner* — Dustin Nguyen
(74) *Attorney, Agent, or Firm* — Sughrue Mion, PLLC

(57) ABSTRACT

A method for reserving resources in a packet communication network, preferably an IP protocol network. The method includes sending an active packet containing a request for reservation of resources for an active data flow, receiving the packet by an active node in the network, and reserving resources of the node according to the request. In this method, an active packet communication network node, in particular an IP active router, reserves resources for processing data of an active data flow according to a resource reservation request for this active data flow contained in this active packet received by the node.

19 Claims, 1 Drawing Sheet

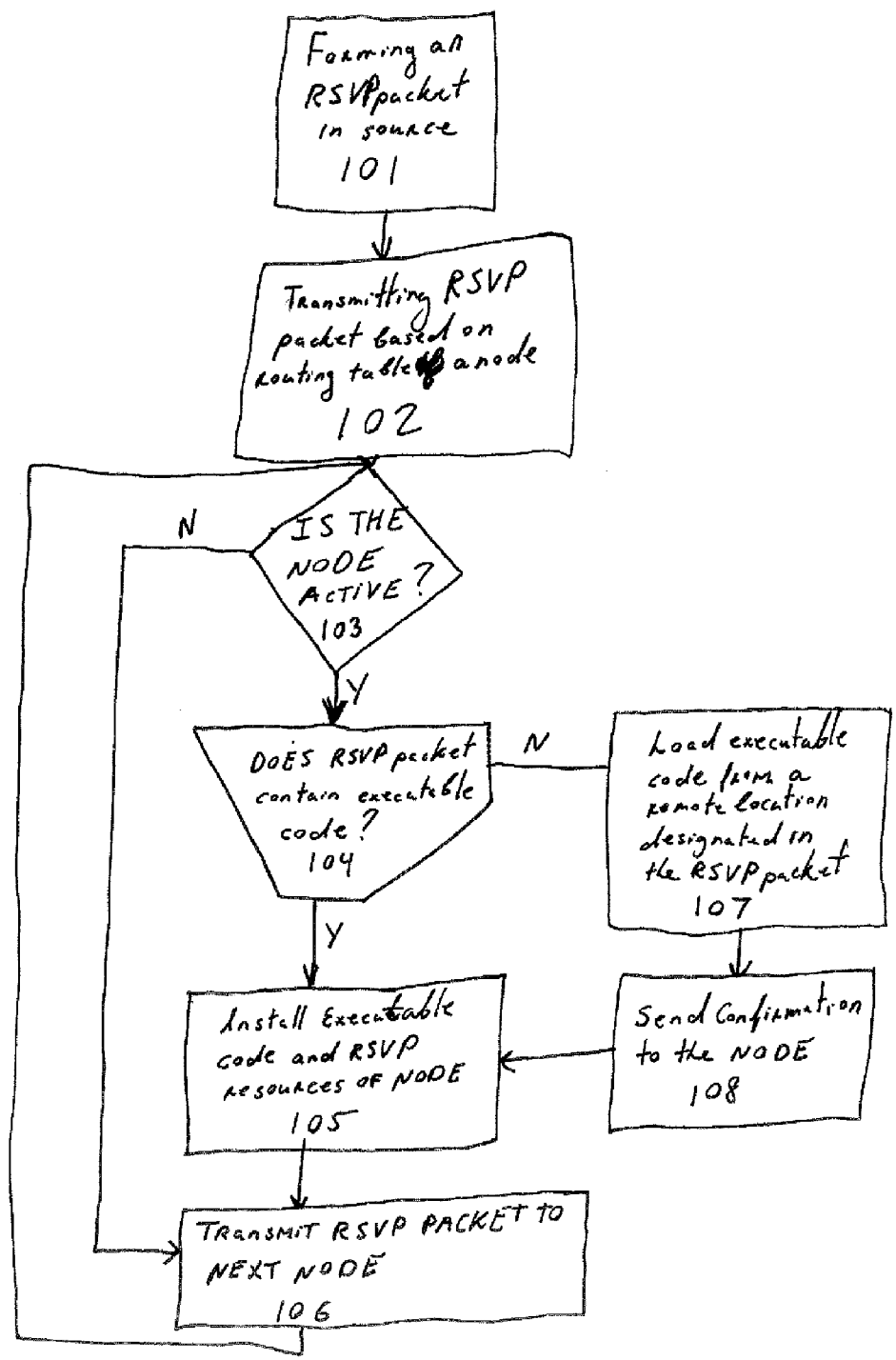

ACTIVE MEDIUM FOR RESERVING RESOURCES IN A COMMUNICATION NETWORK

BACKGROUND OF THE INVENTION

1. Field of the Invention

The invention concerns the reservation of resources in routers of a packet communication network, in particular an IP protocol network.

2. Description of Related Art

Active network refers to a network comprising so-called active nodes or routers, that is to say those capable of being programmed or configured remotely in order to be able to dynamically modify specific processing on the data passing through the network. In this case the routers receive appropriate packets which can comprise commands, a code or a program to be executed by the router concerned, as well as associated information. The packets carrying these commands, information, code or program intended for an active node are here referred to as "active packets", as opposed to the other packets, referred to as "passive packets", which do not contain data related to a particular execution environment of the active nodes.

Certain of the data contained in the active packets can either directly constitute a code executable by the active nodes, or identify a server and a code downloadable by the nodes from the server indicated.

The active and passive packets have different attributes so that any active node can recognise whether or not a received packet is active. Different methods exist for making a packet active. With regard to an IP protocol network, a first method consists of making the packet active by including a marker in its header. For this, a reserved option of the IP packet can be defined. According to another method, one of the FLOW LABEL fields of the IPv6 protocol is used for marking the packet as active. In particular a predetermined value can be given to such a field in the active packet containing a resource reservation request. According to yet another method, a marker of an MPLS label of the packet indicates that the packet is active. The use of a marker included in an MPLS label allows the router to determine more quickly if the packet is active. The same marker can be used in MPLS labels of packets in the flow with reserved resources. Consequently, an active router can thus determine the active nature of a packet it receives by verifying the presence of the marker in the packet.

A network can however comprise both active nodes and passive nodes, that is to say those not designed to take into account the information in active packets. Such a network is then referred to as a "hybrid active network" or more simply "hybrid network".

Generally, the routing criteria for active packets in hybrid networks are different from those for passive packets. This is because the active packets must be routed as a matter of priority to the routers capable of taking into account the active packets, that is to say to the active routers. This type of routing is for example described in the article "Optimised Routing in Hybrid Active Networks" presented during the international conference "OPENARCH 2002".

Active data flow or active flow refers to a flow of packets relating to one and the same application and consequently requiring a specific consistency of processing by the routers concerned. An active flow is identified by the fact that the packets constituting this flow are packets made active by one or other of the methods mentioned previously, or by any other appropriate method. An active data flow is conventionally processed in one and the same execution environment, by one and the same instance of a program started up in a router through which the flow passes. The same program instance is used in order to obtain consistent processing of the different packets in the active flow. The processing can for example consist of transcoding an IP video flow from one format to another by the same program instance. The same program instance must then be used for carrying out the transcoding of the frames on account of the fact that the processing of the video frames in the flow can vary according to the context set by preceding frames.

Establishment of a quality of service—also referred to as QoS—of the transmissions on a communication network is also known, by reserving resources for specific data flows passing through a network. A resource reservation protocol called "Beagle" in described in the document "Technical Report CMU-CS-98-150" published in July 1998 by the Carnegie Mellon University in the United States. This protocol is used for reserving execution resources for active flows throughout the routes which will then be followed by the packets in these flows to be processed by the active nodes. The reservation of execution resources is performed by sending a packet according to this protocol and this packet contains resource reservation commands placed in its payload. When a reservation packet in the Beagle protocol passes through them, the active routers recognise it because of the protocol number written therein. Corresponding execution resources are then reserved in the active routers which are the destinations of these commands.

However this method has drawbacks for hybrid networks. This is because the packets in the Beagle protocol containing the reservation commands are routed in the network as passive packets and are therefore routed through the network as a passive packet. They therefore pass indiscriminately through active routers and passive routers. Consequently, the packets containing the reservation commands may possibly pass through only passive routers, and as a result they are not processed by any active router in the network. The desired resource reservation therefore does not take place in this case.

SUMMARY OF THE INVENTION

Moreover, the packets containing the reservation commands may follow a path in the network different from the path followed by the packets in the active flows for which they are supposed to perform the resource reservation. This is because the routing of active packets is generally different from the routing of passive packets through the network. Thus, the reservation commands may be unnecessarily implemented by active routers not passed through by the packets in the corresponding active flow and on the contrary they are not bound to be supplied to the active routers actually passed through by the packets in the corresponding active flow.

The aim of the invention is to overcome these drawbacks at least partially.

To that end, the invention proposes a method for reserving resources in a packet communication network, preferably an IP protocol network, this network being a hybrid network comprising both active nodes and passive nodes, the active nodes alone being capable of taking into account so-called active packets, that is to say those containing information related to a corresponding execution environment of these active nodes, an active data flow being a set of active packets having to be taken into account by one and the same execution environment, the said method comprising the steps of:

a) sending on the network of a reservation packet containing a request for reservation of resources constituting an execution environment for an associated active data flow;

b) receiving of the said reservation packet by an active node of the network; and c) reservation of resources of the node according to the said request, the said method being characterised in that the said reservation packet is an active packet.

In one preferred embodiment, the said reservation packet is in the RSVP protocol format. The said packet can advantageously be of the PATH type of the RSVP protocol.

In another preferred embodiment, the reservation packet comprises an identifier of the said active data flow.

In yet another preferred embodiment of the method, the reservation packet is provided for containing parameters for processing data contained in the said associated active data flow, this processing being a code executable by an active node of the network, and in that, in the case of these processing parameters being present, the step b) is followed by:

b1) a step of loading by the said active node of the said corresponding executable code; and b2) a step of execution of the said code by the said active node.

These processing parameters can directly constitute the code executable by the active node or, according to a variant, identify a server and a code downloadable by the node from this server.

In one preferred embodiment, the method comprises, after the step b1), a step of:

b3) sending on the network by the said node of a confirmation of loading of the said executable code.

The invention also proposes an active packet communication network node, in particular an IP active router, for implementing the method described above. This node is provided for detecting if a received active packet is a reservation packet and for reserving corresponding resources for processing the data of an active data flow according to a resource reservation request for the said active data flow and contained in the said active reservation packet.

The invention is now described in more detail in the following description.

BRIEF DESCRIPTION OF THE DRAWINGS

Various other aspects, features and attendant advantages of exemplary embodiments of the present invention will become fully appreciated as the same become better understood when considered in conjunction with the accompanying detailed description, the appended claims, and an accompanying drawing, in which:

FIG. 1 shows a method of reserving resource in a packet communication method according to an exemplary embodiment of the present invention.

According to the invention, an active packet containing a resource reservation request for an active data flow is sent on a packet communication network. When the packet is received by an active node of the network, this node reserves the resources according to the request, at least if the reservation request concerns this node.

The invention advantageously applies to IP protocol (Internet Protocol) communication networks in which case the nodes are referred to as routers. In this case, an active IP packet containing a resource reservation request for an active data flow is sent. When this packet is received by an active router of the network, this router reserves the resources according to the request, at least if the reservation request concerns this node.

Thus, when a source terminal sends a data flow to a destination terminal via the network, it can first send an active packet containing the resource reservation request. Of course, the active packet containing the reservation request can also be sent by a router of the network, in that case acting on behalf of this terminal. As the packet containing the resource reservation request is active, it follows the same path in the network as the packets of the active flow sent subsequently for which the reservation request is sent. Thus, the packets of the active flow concerned pass through active routers which have previously interpreted the reservation request and therefore have reserved the desired resources for these packets.

The packet containing the reservation request comprises an identifier of the packets in the active flow for which resources must be reserved. The identifier can in particular comprise a reference to:

a protocol used by these active packets;

a source or a destination of the packets in the active flow, it being specified that it can be a terminal, but also for example a router of the network; or any other appropriate parameter.

This packet also contains data identifying the resources to be reserved by the router or routers concerned. These resources, which define an execution environment, can comprise a memory space allocated in the router for the corresponding active flow or else a passband size for this active flow. They can also comprise—alternatively or in addition— the allocation of a processing time for the processing unit of the router or else the assigning of a given coprocessor of the router to the processing of the active flow concerned when the router comprises a number of processors. The packet containing the request can contain resource reservation parameters such as router specifications so that only the active routers having these specifications implement the reservation request. Thus, the packet containing the reservation request can specify that the resource reservation is to be performed only by the active routers of a given type.

Next to the definition of the resources to be reserved, the packet containing the request can also have parameters for processing the data of the active flow such as a command defining conditions of use of the resources by an active router. Thus, the command can specify a maximum duration for performing the processing of the active flow by the active router. Beyond this duration, the router considers that an error has occurred during the processing or transmission of the active flow and consequently performs error handling tasks such as the sending of an error message to a source of the flow.

Another example of a parameter for processing the data of the active flow is a command defining the processing of the active packets to be performed by an active router, in other words the command identifies the code to be executed by the active router. The code to be executed can be permanently present in the router. An advantageous variant consists of having the code downloaded by the router as will be described later.

More generally, the packet containing the request can comprise any kind of useful information or command concerning the processing codes of the routers, etc. which can for example be placed in extensions of the RSPEC and TSPEC fields of a PATH packet in the RSVP protocol format.

The reservation request with the aforementioned possible parameters, contained in an active packet according to the invention, can be a request common to all the active routers of the network, that is to say each of the active routers implements the same resource reservation.

In a variant, the reservation request and/or these aforementioned parameters contained in an active packet according to the invention can also be intended for one or more specific active routers of the network. In this case, different reservation requests and/or parameters can be provided for different active routers. Thus, the active packet containing the resource reservation request can contain different types and/or values of resource to be reserved, each being implemented by other active routers of the network. Such a distinction of the resources to be reserved can in particular be related to the location of the active routers in the network. By way of example, the processing of the packets in the active flow for which the resource reservation is made can comprise encryption of the packets by the active router at the input of the network and decryption by the active router at the output of the network. Consequently, it is advantageous to produce resource reservation requests comprising resource types and resource and/or processing parameters according to the type of router, its location in the network or the route travelled in the network, or any other parameter dependent on the router.

The packet containing the request is preferably in the RSVP protocol format. Thus, the packet containing the request can be interpreted by the routers interpreting this protocol. It is then not essential to change all the routers in order to perform a resource reservation on the network. RSVP protocol processing applications must possibly be updated in order to take into account new fields defined in RSVP protocol extensions. The active packets sent in an RSVP protocol are normally routed by passive routers. The use of passive routers therefore does not disrupt their transmission on the communication network.

The packet containing the request is preferably a PATH type packet of the chosen RSVP protocol. In the RSVP protocol, a PATH packet is a packet containing a resource reservation request.

The routing of the packet containing the request and of the corresponding active packets is preferably modified in order to pass through active routers as a matter of priority. It can thus be provided that the active routers have one routing table specific to the active packets and another routing table specific to the passive packets. The routing table for the active packets can then advantageously be provided for routing these packets only—or at least as a matter of priority—to active routers. The processing of active packets is thus optimised since the active packets as a matter of priority pass through active routers capable of processing them in a specific way. The processing of the packets can for example be modified according to the transmission conditions of the network. The processing of an IP video flow can in particular consist of transcoding the packets in order to reduce the image quality when the transmission conditions on the network deteriorate.

Provision can also be made that, following the reception of an active packet containing a resource reservation request, the active router of the network loads one or more codes which the router will execute. Such a code to be executed can in particular be used to specifically process the data flow for which resources are reserved in the router. The loading of such a code can be performed according to a number of alternatives. The code can either be included in the packet containing the request, or be included in packets in the data flow with reserved resources, or be made available on a server in communication with the active router. In the case where the code is made available on a server, the packet containing the request or a packet in the data flow with reserved resources can contain the address of the server and an identifier of the code to be loaded. The active router can then send a code send request to the server. It is advantageous that the router sends the source of the active packet containing the reservation request a confirmation message after it has completely downloaded the code to be executed. Thus, the source knows that the active router is ready to execute the code for the active flow concerned and therefore the source can in reply send it the packets in the corresponding active flow.

Fig. 1 depicts a method of reserving resources in a packet communication network according to an exemplary embodiment of the present invention. In operation 101, an RSVP packet is formed in a source, as described above. In operation 102, the RSVP packet is transmitted to a node based on, for example, a routing table provided at the source, That is, as explained above, in an exemplary embodiment, each node may have a routing table for active nodes and a routing table for passive nodes. In operation 103, it is determined whether the node that received the RSVP packet is an active node or a passive node. If it is determined that the node is passive, then the RSVP packet is transmitted to the next node in operation 106. On the other hand, if the node is active, the node checks if the RSVP packet includes executable code, in operation 104. If the executable code is provided in the RSVP packet, the node installs the execution code and reserves resources of the node based on the RSVP packet information, in operation 105. If, however, the RSVP packet does not have the executable code, the node loads the executable code from a remote location as designated in the RSPV packet, in operation 107. The confirmation is then sent to the node when all the executable code has been provided in operation 108. The node then installs the executable code and reserves the necessary resources as indicated in the RSVP packet information, in operation 105. The RSVP packet is then transmitted to the next node, in operation 106 and the process is repeated from operation 103.

Of course, the present invention is not limited to the examples and embodiments described and depicted, but is capable of many variants accessible to persons skilled in the art.

What is claimed is:

1. A method for reserving resources in a packet communication network, wherein the packet network is a hybrid network comprising both active nodes and passive nodes, wherein the active nodes consider information in active packets, said information relating to an execution environment of a respective active node, and wherein an active data flow comprises a set of active packets executed by the execution environment, the method comprising:

sending a reservation packet comprising a request for reservation of resources constituting an execution environment for the active data flow;

receiving said reservation packet by an active node in the network; and reserving resources of the active node according to the request, wherein said reservation packet is in an active packet format, wherein the active packet format comprises an indicator that indicates that the active packet comprises executable code or identifies a server from which an executable code is downloadable;

wherein said resources constituting the execution environment comprise at least one of memory, passband size, and processing time, and wherein the reservation packet comprises parameters which are common to the active nodes of the network and wherein the parameters comprise parameters for processing data of the active data flow including a command defining conditions of use of the resources by the active node and the command identifies a maximum duration for performing the processing of the active data flow by the active node.

2. The method of claim 1, wherein said reservation packet is in RSVP protocol format.

3. The method of claim 1, wherein said reservation packet is a PATH type packet in accordance with RSVP protocol.

4. The method of claim 1, wherein the reservation packet comprises an identifier of the said active data flow.

5. The method of claim 1, wherein said reservation packet comprises parameters for processing data contained in said active data flow, wherein the processing of the data comprises executing code by the active node in the network, and wherein, after receiving the reservation packet, the active node loads the executable code and executes the loaded code.

6. The method of claim 5, wherein said processing parameters comprise said code executable.

7. The method of claim 5, wherein said processing parameters identify a server and code downloadable by said active node from said server.

8. The method of claim 5, wherein after the active node loads the executable code, the active node sends a confirmation of said loading of the executable code.

9. An active packet communication network node, for implementing the method according to claim 1, wherein the node is provided for receiving the active packets, for detecting if one of the received active packets is the reservation packet and for reserving corresponding resources for processing the data of the active data flow according to the resource reservation request for the said active data flow and contained in the active reservation packet.

10. The method of claim 1, wherein the packet network is an IP protocol network.

11. The node of claim 9, wherein the node is an IP active router.

12. The method of claim 1, wherein the active packet format comprises a marker in a header of the active packet, the marker indicating whether the packet is active or passive, wherein, when the marker indicates the packet is active, the marker identifies that the active packet comprises at least one of command, code, and program for execution in the active node and wherein the reservation packet has the marker indicating the packet is active.

13. The method of claim 8, wherein the confirmation of said loading of the executable code indicates that said loading was successful.

14. The method of claim 1, wherein the reservation packet comprises a first identifier identifying a protocol for the active data flow, a second identifier identifying a source or destination of the active data flow, and a third identifier identifying resources of the active node that are to be reserved for executing code subsequently provided in the active packets of the active data flow.

15. The method of claim 1, wherein the active packets comprise executable code or information identifying a server from which executable code is downloadable.

16. The method of claim 1, wherein said resources constituting the execution environment comprise a memory allocated for the active data flow and a processing time for processing of the active data flow.

17. The method of claim 1, wherein said resources constituting the execution environment comprise a memory allocated for the active data flow and a passband size for the active data flow.

18. The method of claim 1, wherein said resources constituting the execution environment comprise a processing time for processing of the active data flow and a passband size for the active data flow.

19. The method of claim 1, wherein the reservation packet comprises parameters for processing data contained in the active data flow, in which the parameters include a command defining conditions of use of the resources by the active node or a command defining processing of an active packet by the active node.

* * * * *